Patented Aug. 30, 1949

UNITED STATES PATENT OFFICE 2,480,105

METHOD FOR THE PREPARATION OF AMINOPHTHALIDYLALKANE SALTS

Glenn E. Ullyot, Philadelphia, Pa., assignor to Smith, Kline & French Laboratories, Philadelphia, Pa., a corporation of Pennsylvania No Drawing. Application February 2, 1946, Serial No. 645,228

9 Claims. (Cl. 260—346)

1

This invention relates to a method for the preparation of aminophthalidylalkane salts and, more particularly, for the preparation of aminophthalidylalkane salts having the following structure:

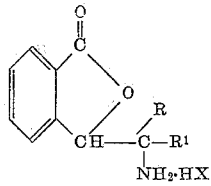

in which R is H when $R^1$ is a member of the group consisting of H, $CH_3$, $C_2H_5$, $C_3H_7$, $C_4H_9$, $C_5H_{11}$, an aryl group; and R is $CH_3$ when $R^1$ is $CH_3$; and X is an acid radical.

As illustrative of compounds within the above formula, which may be readily and efficiently prepared in high yield by the method according to this invention, may be mentioned by way of example aminophthalidylmethane hydrochloride, 1 - amino - 1 - phthalidylethane hydrochloride, 1 - amino - 1 - phthalidylpropane hydrochloride, 2 - amino - 2 - phthalidylpropane hydrochloride, 1 - amino - 1 - phthalidylbutane hydrochloride, 1 - amino - 1 - phthalidylpentane hydrochloride, 1 - amino - 1 - phthalidylhexane hydrochloride, and the like salts of other acids.

Generally speaking, the method according to this invention will comprise the reduction of a corresponding nitro phthalidylalkane having the following formula, under particular conditions:

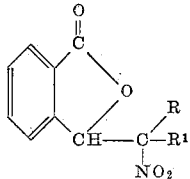

in which R is H where $R^1$ is a member of the group consisting of H, $CH_3$, $C_2H_5$, $C_3H_7$, $C_4H_9$, $C_5H_{11}$, an aryl group; and R is $CH_3$ when $R^1$ is $CH_3$.

Nitrophthalidylalkanes having the structure of the above formula may be prepared by condensing phthalaldehydic acid with a nitroalkane having the structure

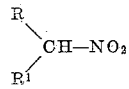

of the group consisting of H, $CH_3$, $C_2H_5$, $C_3H_7$, $C_4H_9$, $C_5H_{11}$, an aryl group; and R is $CH_3$ when

2

$R^1$ is $CH_3$; in an alkaline medium, as, for example, a sodium hydroxide solution in a known manner.

According to the method of this invention, a nitrophthalidylalkane having the structure of the above formula is reduced under an initial hydrogen pressure of preferably not less than about 25 pounds in the presence of a noble metal catalyst and an acid having an ionization constant of $1.8 \times 10^{-5}$ or greater in a solvent for the nitrophthalidylalkane and the acid, and, preferably, also for the reduction product at reaction temperature, at a temperature at which the reaction will proceed with reasonable rapidity and preferably such that undesirable side reactions will be avoided.

When the reaction is completed, the product will be recovered by filtering hot to remove the catalyst, distilling off the solvent in vacuo, washing the residue, for example, with acetone, and purifying by crystallization from a solvent.

More specifically, the noble metal catalyst for use in carrying out the method may be, for example, palladium, platinum, or the like, and the catalyst will desirably be disposed in or on a carrier such as charcoal, finely divided carbon, kieselguhr, or the like.

The acid having an ionization constant of $1.8 \times 10^{-5}$ or greater may be, for example, hydrochloric acid, sulfuric acid, hydrobromic acid, acetic acid, or the like; and the solvent, for example, may be a lower monohydric alcohol, as, for example, ethyl alcohol, the methyl ether of ethylene glycol, or the like, or in the case of an organic acid, the acid itself may act as the solvent.

The initial hydrogen pressure will be at least 25 pounds and may be 1000 pounds or more, desirably an initial hydrogen pressure of 50–500 pounds will be used.

The reaction will be carried out at a temperature, as has been indicated, which will cause the reaction to proceed with reasonable rapidity without causing undesirable side reactions. For example, the temperature will desirably be within about the range 50° C.–100° C., and preferably within about the narrower range 70° C.–80° C., or specifically about 75° C.

In proceeding with a strong mineral acid, at least one equivalent of a strong mineral acid will be used per mol of nitrophthalidylalkane, as, for example, in the case of hydrochloric acid 45 cc. of 36% HCl to 100 gms. of nitrophthalidylalkane, with which about 400–500 cc. of solvent, as ethyl alcohol, will be used.

Generally speaking, the reaction will be complete in from about 4–8 hours and completion will be indicated when the hydrogen pressure ceases to drop.

The following examples will be more specifically illustrative of the method according to this invention:

Example 1

For the preparation of 2-amino-2-phthalidylpropane hydrochloride, eleven grams (0.05 m.) 2-nitro-2-phthalidylpropane were dissolved in 200 cc. alcohol. One gram of carbon, 10 cc. 16% palladium chloride and 4.2 cc. of concentrated hydrochloric acid were added and the total was placed in a citrate bottle provided with a heating jacket. Reduction was carried out on a Burgess-Parr apparatus at 70–80° C. at an initial gauge pressure of 50 lbs./sq. in. Approximately the theoretical amount of hydrogen (0.15 m.) was absorbed in seven hours.

Following reduction, the catalyst was removed from the hot solution by filtration and distillation was carried out, with the addition of benzene from time to time. Crystals precipitated during this process. After most of the solvent had been removed, the solid residue was washed with acetone and collected. Ten and four-tenths grams of hydrochloride salt were obtained.

Recrystallization from alcohol gave a colorless crystalline product which decomposed at about 285–289° C. (Closed capillary). This decomposition temperature varied somewhat with the rate of heating.

Example 2

For the production of 1-amino-1-phthalidylpropane hydrochloride, one hundred grams (0.45 m.) of 1-nitro-1-phthalidylpropane, 425 cc. of a mixture of 10% methyl alcohol and 90% ethyl alcohol, 43 cc. (0.5 m.) concentrated hydrochloric acid, 100 cc. 16% palladium chloride solution and 10 g. activated carbon were placed in a suitable glass-lined autoclave and reduction was carried out at a temperature of 70° C. at an initial gauge pressure of 500 lbs./sq. in. while agitating the autoclave. Reduction was completed in 5 to 7 hours when the gauge pressure dropped to 175–200 lbs./sq. in at room temperature. With the apparatus used the gauge pressure at room temperature should have been about 181 lbs./sq. in.

After reduction was completed, the contents of the autoclave were removed, heated to near the boiling point and the catalyst was removed by filtration. The solvent was removed by distillation and the product was washed with acetone. The yield of crude product varied from 80–95% and melted at about 208–223° C. with decomposition.

Example 3

11 g. (0.05 m.) of 1-nitro1-1-phthalidylpropane was dissolved in 60 cc. (1.00 m.) of glacial acetic acid and 5 g. of 10% palladium-charcoal catalyst. The 11 g. were dissolved and placed in a citrate bottle and 5 g. of the catalyst were added. Reduction was carried out on a Burgess-Parr apparatus at an initial gauge pressure of 50 pounds per square inch. The hydrogen uptake amounted to 0.14 mol. After removal of the catalyst by filtration, hydrochloric acid in excess of 0.05 equivalent was added to the filtrate and the solvent removed in vacuo. The residue was washed with acetone. 7.4 g. of crude 1-amino-1-phthalidylpropane hydrochloride were obtained, or a yield of 64.9%.

Purification: The fractional crystallization of 1-amino-1-phthalidylpropane hydrochloride from 90% isopropyl alcohol resulted in the isolation of two racemic forms, one of which melted with decomposition in the range of 268–270° C. and the other, which melted with decomposition in the range of 238–240°±2° C.

What I claim and desire to protect by Letters Patent is:

1. The method of producing aminophthalidylalkane salts having the following formula:

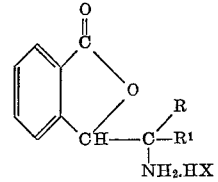

in which R is H when $R^1$ is a member of the group consisting of H, $CH_3$, $C_2H_5$, $C_3H_7$, $C_4H_9$, $C_5H_{11}$ and an aryl group; and X is an acid radical, which comprises reducing, in the presence of a noble metal catalyst, a corresponding nitrophthalidylalkane with hydrogen under pressure in the presence of at least one molar equivalent of an acid selected from the group consisting of a mineral acid and an organic acid having an ionization constant not less than $1.8 \times 10^{-5}$.

2. The method of producing aminophthalidylalkane salts according to claim 1, characterized by the fact that the nitrophthalidylalkane and the acid are in solution in a common solvent.

3. The method of producing aminophthalidylalkane salts according to claim 1, characterized by the fact that the nitrophthalidylalkane and the acid are in solution in a common solvent which is a solvent for the aminophthalidylalkane salt product of the reduction.

4. The method of producing aminophthalidylalkane salts according to claim 1, characterized by the fact that the reduction with hydrogen under pressure is in the presence of an organic acid having an ionization constant not less than than $1.8 \times 10^{-5}$.

5. The method of producing aminophthalidylalkane salts according to claim 1, characterized by the fact that the reduction is carried out under an initial hydrogen pressure of not less than about one atmosphere.

6. The method of producing aminophthalidylalkane salts according to claim 1, characterized by the fact that the reduction is carried out under a hydrogen pressure within the range 50–500 pounds.

7. The method of producing aminophthalidylalkane salts according to claim 1, characterized by the fact that the reduction is carried out under a hydrogen pressure of not less than about 50–500 pounds and at a temperature of not less than about 50° C.

8. The method of producing aminophthalidylalkane salts according to claim 1, characterized by the fact that palladium comprises the catalyst, hydrochloric acid comprises the acid, initial hydrogen pressure is selected from the group consisting of 50–500 pounds and the temperature is within about the range 70° C.–80° C.

9. The method of producing 1-amino-1-phthalidylpropane salts which comprises reducing, in the presence of a noble metal catalyst, 1-nitro-1-phthalidylpropane with hydrogen under pressure in the presence of at least one molar equivalent of an acid selected from the group consisting of a mineral acid and an organic acid having an ionization constant not less than $1.8 \times 10^{-5}$.

GLENN E. ULLYOT.

No references cited.